Jan. 16, 1951
C. W. WALZ ET AL
2,538,402
BEET HARVESTER
Filed Dec. 18, 1945
4 Sheets-Sheet 1
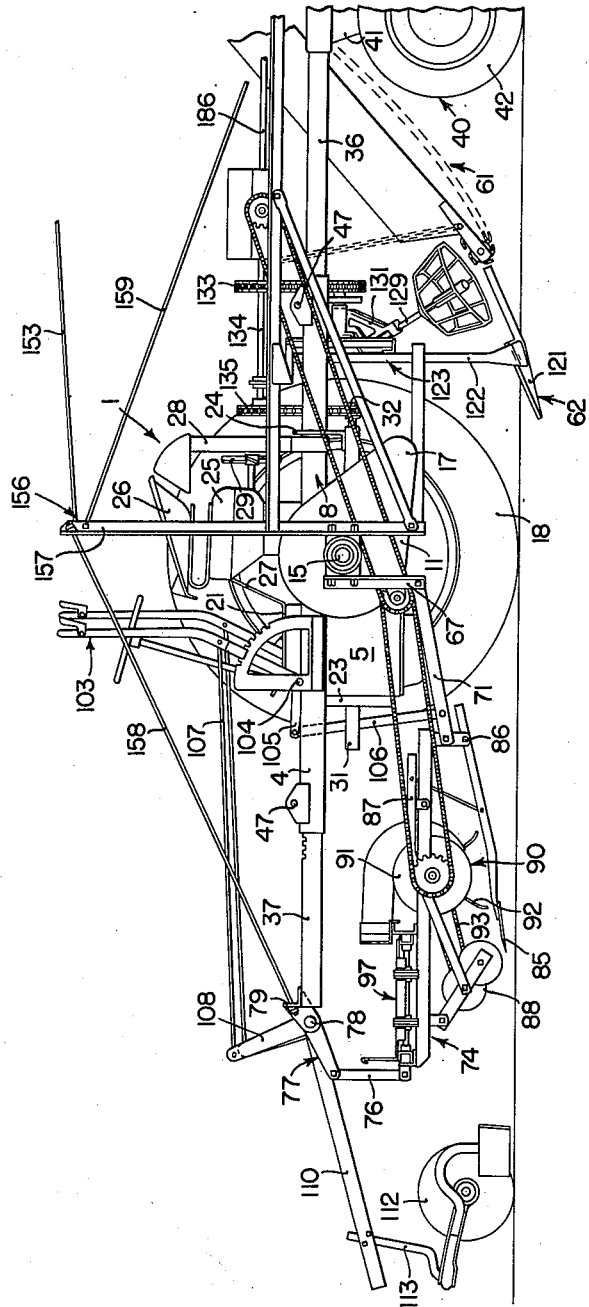
FIG. 1
INVENTORS
CLAUDE W. WALZ
THOMAS J. RISLEY
BY
ATTORNEYS.

Jan. 16, 1951 C. W. WALZ ET AL 2,538,402
BEET HARVESTER
Filed Dec. 18, 1945 4 Sheets-Sheet 2
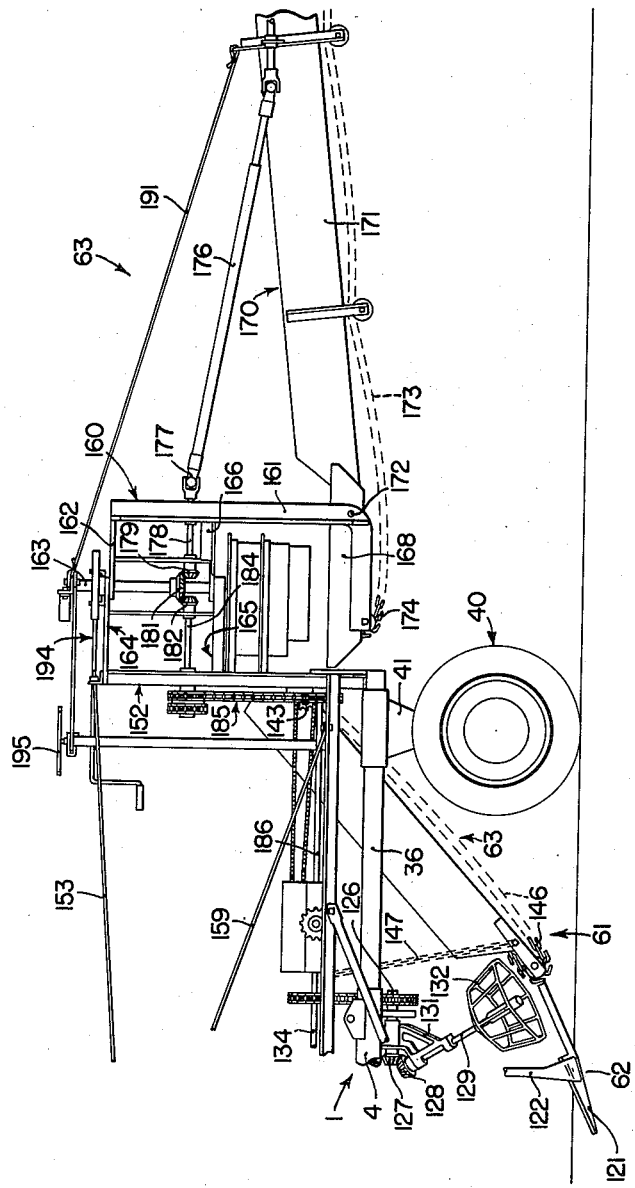
FIG. 2
INVENTORS
CLAUDE W. WALZ - THOMAS J. RISLEY
ATTORNEYS.

Jan. 16, 1951

C. W. WALZ ET AL 2,538,402

BEET HARVESTER

Filed Dec. 18, 1945

INVENTORS
CLAUDE W. WALZ - THOMAS J. RISLEY
BY
ATTORNEYS.

Patented Jan. 16, 1951

2,538,402

UNITED STATES PATENT OFFICE 2,538,402

BEET HARVESTER

Claude W. Walz and Thomas J. Risley, Rock Island, Ill., assignors to Deere & Company, Moline, Ill., a corporation of Illinois Application December 18, 1945, Serial No. 635,834

6 Claims. (Cl. 55—107)

The present invention relates generally to agricultural machines and more particularly to harvesters, especially harvesters for root crops, such as sugar beets or the like.

The object and general nature of the present invention is the provision of a unitary self-propelled harvester, and a further object of this invention is the provision of a harvester particularly constructed and arranged for mounting on a two wheel tractor of the unstable type, with certain units of the harvester mounted in front of the forward driving wheels of the tractor while other units of the harvester are mounted rearwardly thereof, thereby providing a balanced outfit which is conveniently operated and easily steered by auxiliary dirigible wheels which are detachably associated with a tractor of this type.

These and other objects and advantages of the present invention will be apparent to those skilled in the art after a consideration of the following detailed description, taken in conjunction with the accompanying drawings in which one form of the invention has been shown by way of illustration.

In the drawings:

Figures 1 and 2 are side views of a combined tractor and beet harvester in which the principles of the present invention have been incorporated.

Figure 3:
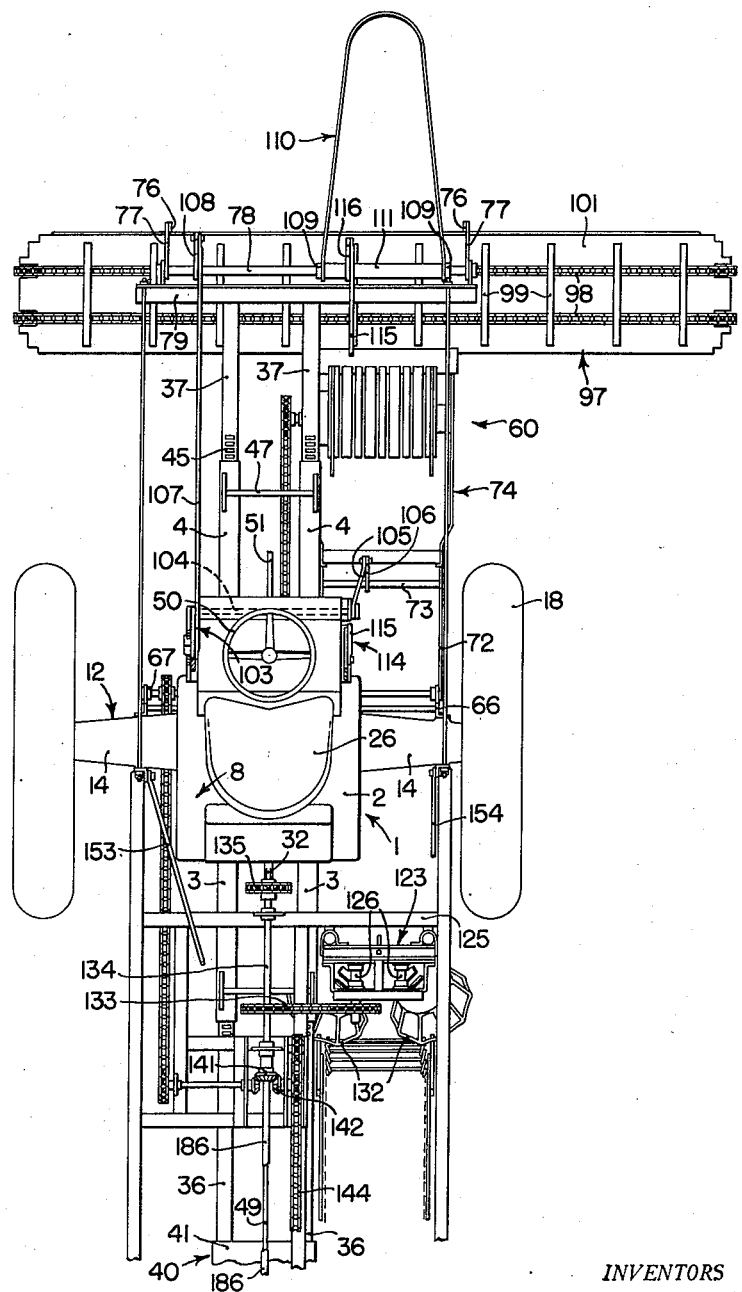
Figures 3 and 4 are top or plan views of the harvester shown in Figures 1 and 2.
Figure 4:
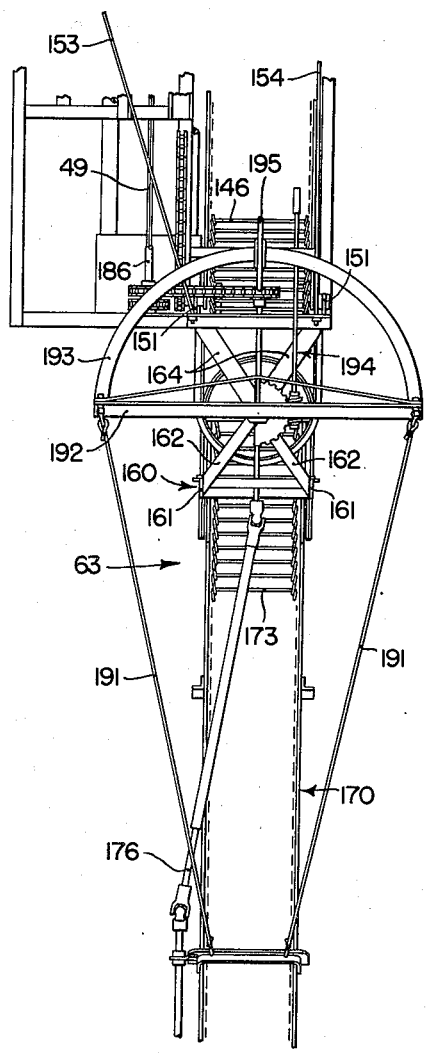

Referring now to the drawings, the tractor is indicated in its entirety by the reference numeral 1 and is substantially the same as the tractor shown in the U. S. Patent 2,511,692, issued June 13, 1950 to Theophilus Brown, to which reference may be had if necessary. Briefly, the tractor 1 comprises a longitudinally extending body or frame 2 which includes a pair of laterally spaced generally longitudinally extending parallel tubular sections 3 and 4 which carry there between a power plant 5. The latter includes an internal combustion engine or other prime mover which has a transmission gear casing rigidly secured thereto. The power plant 5 is mounted on the parallel tubular members 3 and 4 by means of a support member in the form of a casting 8 having a pair of tubular sleeve portions which receive the aforesaid tubular frame members or extensions 3 and 4. The casting 8 also includes a pair of gear housing portions 11 that are disposed on opposite sides of the tubular frame extensions 3 and 4. Each gear housing 11 is open outwardly and is covered by the outwardly flaring inner end of an associated axle housing member 12, the inner end of which is flanged outwardly and bolted or otherwise secured to the annular rim of the associated gear housing 11. The axle housing 12 includes a laterally outwardly directed quill section 14, and in each of the sections 14 a drive axle 15 is journaled for rotation. The inner end of each of the drive axles 15 receives a large gear or sprocket which is driven by a smaller gear or sprocket that is disposed in a generally downwardly positioned housing extension 17 which preferably is bolted or otherwise fixed to the main gear housing 11, 12. The engine 5 drives the two drive axles 15 through the transmission mechanism within the casing 17, preferably through differential mechanism, of conventional construction so far as the present invention is concerned. A main drive wheel 18 is fixed to the outer end of each drive axle 15.

An operator's platform 21 is disposed over the engine 5. In the interest of simplicity, the clutch, brake, and gear shift control levers or similar members, as well as other controls of the tractor, are omitted from the drawings since per se they form no part of the present invention but may be of any conventional design and arrangement. The forward end of the engine 5 is securely bolted or otherwise fastened to a supporting plate 23 and the rear end of the transmission housing 17 is secured, as by bolting, to a transverse supporting plate 24 which is rigidly welded to the tubular frame extension members 3 and 4. Directly above the transmission housing 17 just behind the engine 5, is a fuel tank 25 on the top of which the tractor seat 26 is carried, as by a spring member 27. A radiator 28 is disposed vertically behind the operator's seat 26 and is connected in any suitable way to the frame extensions 3 and 4, and a fan 29 is mounted for rotation on the tractor just in front of the radiator 28 and is driven from a rotatable part within the transmission housing 17. The motor 5 is also connected to drive a pair of forwardly and rearwardly extending power takeoff shafts 31 and 32 which may be connected and disconnected in any suitable manner for supplying power to implements ahead of or behind the traction wheels 18, respectively.

The tractor as so far described is of the two wheel or unstable type and for operation usually requires some form of ground wheel unit for stabilizing the tractor. To this end, the forward and rearward frame extensions 3 and 4 are made tubular and are arranged in pairs, as described above. Each pair is adapted to receive a pair of laterally spaced generally longitudinally extending bars or pipe members 36 and 37 which are held together in laterally spaced relation in any suitable manner and of which members 36 constitute a part of an auxiliary dirigible wheel unit indicated in its entirety by the reference numeral 40. The above mentioned Brown patent discloses the details of the auxiliary dirigible unit 40, and hence the same need not be described in detail here. It suffices to note that the dirigible wheel unit 40 comprises a truck frame 41 receiving a pair of relatively closely spaced ground wheels 42 at its lower end and at its upper end is extending laterally to receive the members 36. Preferably, the latter are of substantial length and dimensioned so as to slide in and out of the tubular frame extensions 3 and 4. Also, portions of the bars 36 and 37 are provided with rack teeth 45 which are adapted to be engaged by pinions carried by the tractor frame and mounted on a shaft 47 which may be rotated to extend or retract the slidable members 36 and 37 in the frame extensions 3 and 4, as desired. The wheels 42 are steerable, being journaled on the lower end of a generally vertically disposed spindle which extends upwardly and is connected with a steering gearing that is actuated by a telescopic shaft unit 49 actuated by the steering wheel 50 of the tractor. A second telescopic shaft unit 51 extends forwardly from the frame of the tractor and provides for steering the dirigible wheels of the auxiliary truck unit where the same is mounted in the front frame extensions 3 and 4. The front ends of the front frame extensions 3 and 4 are also provided with a pinion carrying shaft 47 which provides for longitudinal shifting of the dirigible wheeled truck unit that is mounted, if desired, in the forward frame extensions.

The harvesting mechanism that is carried by the tractor 1 comprises, in general, a front or topper unit 60 and a rear unit 61 including puller mechanism 62 and conveyor mechanism 63. These several units are mounted on the tractor 1 by suitable framework that is detachably connected with the tractor frame. For mounting the topper unit 60, there is provided a pair of vertical bars 66 and 67 that are bolted to the front side of the axle housings 14. A pair of links 71 and 72 are pivotally connected at their rear ends to the lower ends of the bars 66 and 67 and at their forward ends are connected together by a cross bar 73. A topping unit frame 74 is pivotally connected at its rear end to the cross bar 73 and extends forwardly and is supported by links 76 which are connected at their upper ends to a pair of arms 77 connected to a tubular rockshaft 78 that is mounted for rocking movement on a relatively heavy cross bar 79 that is fixed in any suitable manner to the forward frame bars 37. The topping unit 60 includes a topping knife 85 pivoted, at 86, to the rear portion of the topping frame 74 and is link connected to a pair of arms 87 which at their forward ends are connected to beet-engaging finder means 88. The frame 74 carries rotatable crop engaging mechanism 90 which includes a rotatable drum 91 having crop engaging fingers 92. A chain 93 connects the topping drum 91 with the wheels of the finder mechanism 88. A top discharge conveyor 97 is mounted on the topping frame 74 for laterally shiftable movement, and the top conveyor unit 97 includes a pair of endless chains 98 connected by flights 99 and mounted for movement over the platform 101 of the conveyor 97. The topping drum 91 is rotated in a direction to remove the tops from the knife 85 and deliver them over onto the conveyor 97. A hand lever 103 is secured to the left end of a transverse shaft 104 carried by the frame of the tractor. The right end of the shaft has an arm 105 that is connected by a link 106 to the transverse bar 73, and a link 107 at the left side of the machine extends forwardly from the lever 103 to an arm 108 on the rockshaft 78. The hand lever 103 operates along the usual notched sector, having cooperating detent mechanism, and by swinging the hand lever 103 in one direction or the other the topping frame 74 may be raised or lowered as desired, and held at will in any position of adjustment. The present invention is not particularly concerned with the details per se of the topping mechanism, these being disclosed and claimed in U. S. Patent 2,433,799, issued December 30, 1947 to Claude W. Walz, Clarence T. Rasmussen and Howard F. Clausen to which reference may be made for a more detailed description of this mechanism. A yoke 110 is mounted at the forward ends of the frame bars 37, as by being fixed to a tubular shaft section 111 mounted on the cross shaft 78 between a pair of collars 109. The yoke 110 carries colters 112 connected to the forward portion of the yoke 110 by standards 113. The colter yoke 110 may be raised and lowered by any suitable means, such as a hand lever 114 or the like at the right side of the machine and which is accessible to the operator mounted on the seat 26 of the tractor and connected by a link 115 to an arm 116 on the tubular shaft section 111.

The beet lifting or pulling mechanism and rear conveyor means will now be described. A pair of puller point members 121 is mounted on a pair of vertical shanks 122 that is carried by a framework 123 that is slidably supported in any suitable manner on a cross frame member 125 fixed to the rear frame extensions 3 and 4. A pair of short shafts 126 is journaled for rotation in the framework 123 and suitably geared together. A bevel gear 127 is fixed to the forward end of each shaft 126 and meshes with a second bevel gear 128 fixed to the upper end of a kicker wheel shaft 129. Each kicker wheel shaft is supported for rotation in a supporting bracket 131 that is carried by the associated shaft 126, whereby each bracket 131, together with the associated kicker wheel shaft 129, may swing inwardly and outwardly to accommodate different sizes of beets. A kicker wheel 132 is fixed to the lower end of each kicker wheel shaft 129. The inner shaft 126 (Figure 3) carries a pulley or gear and is driven by a belt or chain 133 from a pulley or gear on a longitudinally extending shaft 134 which is connected by a chain 135 to the power takeoff shaft 32 of the tractor. The rear end of the shaft 134 carries a bevel gear 141 which meshes with a companion gear on a transverse shaft 142 which drives an upper transverse conveyor shaft 143 through a chain 144 or the like. The shaft 143 carries sprockets or the like which support the upper end of a generally downwardly and forwardly extending elevator 146, the lower end of which is disposed rearwardly and underneath the kicker wheels 132. The lower end of the elevator 146 may be raised and lowered by any suitable mechanism, likewise the puller points 121, kicker wheels 132 and associated parts may also be raised and lowered by raising and lowering the framework 123, as through one or more chains 147. The chain 147 may be raised and lowered by a hand lever, hydraulic cylinder or any other suitable means. The rear transverse elevator shaft 143 is supported by brackets 151 fixed to a vertical framework 152 which is carried at its lower end on the rear ends of the frame members 36. The framework 152 is held in position by pairs of links 153 and 154 which extend forwardly and are connected to the upper end of a framework 156 that includes a pair of forward vertical bars 157 fastened at their lower ends to the rear sides of the axle housings 14. The upper ends of the vertical frame bars 157 are connected by bracing links 158 to the forward portion of the tractor frame and by links 159 to the rear portion of the tractor frame, as best shown in Figure 1.

The rear conveyor unit 63 comprises a laterally swingable relatively heavy frame 160 which includes a pair of generally upwardly extending bars 161, the upper end portions 162 of which converge forwardly and upwardly to receive a vertical pivot shaft 163 which is supported at its upper and lower ends by triangular frame extensions 164 and 165 rigidly connected to the vertical framework 152. A lower triangular frame extension 166 connects the lower portions of the bars 161 with the lower end of the pivot shaft 163, acting in compression to maintain the bars 161 in position. The lower ends of the bars 161 support a hopper construction 168 which receives beets or other crop from the elevator 146. A rear elevator 170 including side bars 171, is pivoted at its forward end, as at 172, to the lower ends of the frame bars 161 and carries rollers, sprockets and the like over which an endless conveyor chain 173 is disposed, the forward portion 174 of which operates in the lower portion of and forms the bottom of the hopper 168. The conveyor chain 173 is driven by any suitable means, preferably by an extension shaft 176 that is connected by a universal joint 177 to a short drive shaft 178 carried by the laterally swingable framework 160. A pinion 179 is fixed to the forward end of the shaft 178 and meshes with a loose pinion 181 mounted on the pivot shaft 163. The pinion 181 meshes with a pinion 182 fixed to the rear end of a drive shaft 184, the forward end of which is connected by sprocket and chain means 185 to the rear portion 186 of the shaft 134, being connected in this way with the power takeoff shaft 32 of the tractor. The outer end of the elevator 170 is supported by cables 191 extending therefrom forwardly and upwardly to a transverse bar 192 which is carried at the upper end of the pivot shaft 163. The cross bar 192 may be swung laterally in one direction or the other so as to swing the elevator 170 laterally in one direction or the other, and to this end a sector 193 is fixed to the cross bar 192 and receives operating mechanism 194 by which the entire rear elevator unit 63 may be swung into different positions laterally, relative to the tractor, and locked in selected positions as by a clamp 195. The present invention is not especially concerned with the particular details per se of the rear elevator mechanism and associated parts, since these are substantially the same as the construction shown in U. S. Patent 2,438,627, issued March 30, 1948 to Claude W. Walz, Clarence T. Rasmussen and Robert D. Griff.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A beet harvester adapted to be mounted on a two-wheel unstable type of tractor, having a central power plant, driving traction wheels and an auxiliary detachable set of steerable ground wheels disposed at the rear of said traction wheels, said harvester comprising a topping unit adapted to be mounted on the front of said tractor, and a beet lifting unit adapted to be mounted on the rear of said tractor and including beet lifters disposed forward of said ground wheels and conveying means receiving beets from said lifters and disposed generally over said ground wheels.

2. A beet harvester comprising a mobile support having laterally spaced front frame extensions, laterally spaced rear frame extensions, and a rearwardly disposed supporting wheel unit carrying dirigible wheel means, a topping unit, means for supporting said topping unit on the front frame extensions comprising a pair of laterally spaced parts interfitting with and secured to said front frame extensions and means mounting said topping unit on said laterally spaced parts, a beet lifting unit including a pair of lifter shoes carried by said rear frame extensions and conveyor means receiving beets from said lifter shoes and carried by said rearwardly disposed dirigible wheel means.

3. A beet harvester-tractor unit comprising a tractor of the two-wheel unstable type having a generally centrally mounted power plant, a pair of drive wheels driven thereby, and both forward and rearwardly extending frame extensions, a beet topping unit mounted on the forward frame extension adjacent the front end thereof, a beet conveyor unit mounted on the rear end of the rearward frame extensions, a dirigible wheel unit carrying the rear end of said rearward frame extension and a major portion of the weight of said conveyor unit, and a beet puller unit carried by said rearward frame extension adjacent the forward portion thereof and adjacent the centrally mounted power plant.

4. A beet harvester-tractor unit comprising a tractor of the two-wheel unstable type having a generally centrally mounted power plant and forward and rear frame sections extending fore and aft, respectively, from said power plant, a beet topping unit carried by the forward frame sections, a beet lifting unit carried by the rear frame sections generally in longitudinal alignment with said topping unit, a rearwardly extending beet elevator mounted at the rear end portions of said rear frame sections, and a rear dirigible wheel unit connected to the rear portions of said rear frame sections and supporting a substantial portion of the weight of said beet lifting unit, said beet elevator extending rearwardly of said dirigible wheel means whereby the latter also supports at least a major portion of the weight of said beet elevator.

5. A beet harvester-tractor unit comprising a tractor of the two-wheel unstable type having a generally centrally mounted power plant, laterally outwardly extending drive axle housing sections extending laterally outwardly from said power plant, and both fore and aft extending frame sections, a beet topping unit at the forward side of the centrally mounted power plant, frame means fixed to said axle housing sections at the forward side thereof and supporting the rear portion of said topping unit, means supporting the forward portion of said topping unit on the forward portions of said forward frame sections, rear frame means fixed to said axle housing sections at the rear side thereof, and a beet lifting unit carried partly by said rear frame means and partly by the rear frame sections of said tractor.

6. The invention set forth in claim 5, further characterized by each of said tractor frame sections comprising generally longitudinally extending laterally spaced tubular portions and said implement frame means including parts extending into said tubular portions in telescopic relation with respect thereto.

CLAUDE W. WALZ.
THOMAS J. RISLEY.

REFERENCES CITED

The following references are of record in the file of this patent:

UNITED STATES PATENTS

| Number | Name | Date |
|---|---|---|
| 909,424 | Kite | Jan. 12, 1909 |
| 1,047,215 | Harrison | Dec. 17, 1912 |
| 1,200,955 | Lawson | Oct. 10, 1916 |
| 1,206,152 | Smith | Nov. 28, 1916 |
| 2,141,806 | Zeilesch | Dec. 27, 1938 |

FOREIGN PATENTS

| Number | Country | Date |
|---|---|---|
| 154,346 | Great Britain | Dec. 1, 1920 |